(12) United States Patent
Hsu et al.

(10) Patent No.: US 7,714,847 B2
(45) Date of Patent: May 11, 2010

(54) CAPACITIVE TOUCHPAD HAVING DUAL TRACES COUPLED WITH UNEVEN SPACED INTERLACED SENSORS

(75) Inventors: Chao-Hui Hsu, Yangmei Township, Taoyuan County (TW); Yen-Chang Chiu, Taipei County (TW)

(73) Assignee: Elan Microelectronics Corporation, Hsinchu (TW)

( * ) Notice: Subject to any disclaimer, the term of this patent is extended or adjusted under 35 U.S.C. 154(b) by 966 days.

(21) Appl. No.: 11/296,218

(22) Filed: Dec. 8, 2005

(65) Prior Publication Data

US 2006/0125801 A1 Jun. 15, 2006

(30) Foreign Application Priority Data

Dec. 14, 2004 (TW) .............................. 93138805 A

(51) Int. Cl.
*G06F 3/041* (2006.01)
(52) U.S. Cl. ...................................... 345/173
(58) Field of Classification Search ......... 345/156–175; 178/18.01, 19.03
See application file for complete search history.

(56) References Cited

U.S. PATENT DOCUMENTS

| | | | |
|---|---|---|---|
| 6,762,753 B2 * | 7/2004 | Satoh et al. ................. | 345/177 |
| 7,382,139 B2 * | 6/2008 | Mackey ...................... | 324/660 |
| 2005/0110768 A1 * | 5/2005 | Marriott et al. ............. | 345/173 |
| 2006/0038791 A1 * | 2/2006 | Mackey ...................... | 345/173 |

* cited by examiner

*Primary Examiner*—Richard Hjerpe
*Assistant Examiner*—Carolyn R Edwards
(74) *Attorney, Agent, or Firm*—Rosenberg, Klein & Lee

(57) ABSTRACT

A capacitive touchpad comprises two traces with a plurality of first and second sensors coupled thereto respectively, and the first and second sensors are arranged interlaced and uneven spaced to each other. By detecting the capacitance variances produced by the sensors from the traces, phase leading or lagging Z-axis signals are generated to determine the moving direction of a finger sliding on the capacitive touchpad.

13 Claims, 9 Drawing Sheets

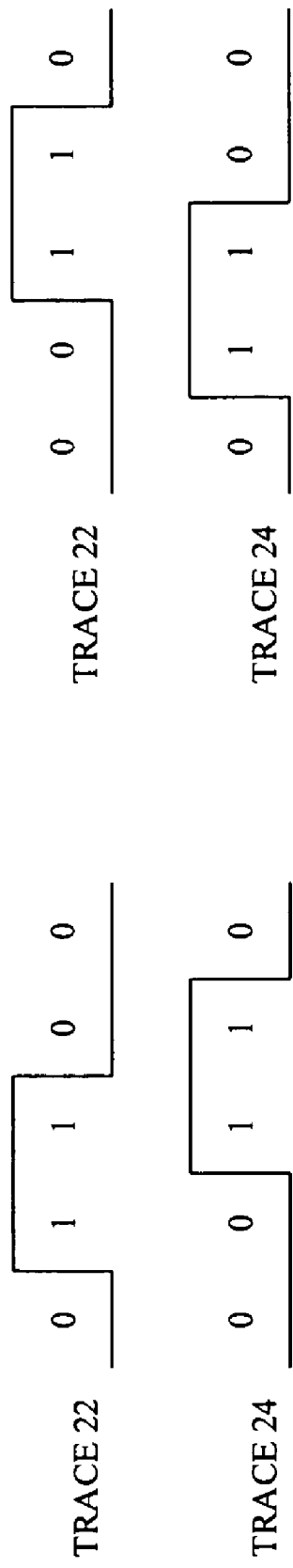

CAPACITIVE TOUCHPAD HAVING DUAL TRACES COUPLED WITH UNEVEN SPACED INTERLACED SENSORS

FIELD OF THE INVENTION

The present invention is generally related to a capacitive touchpad and, more particularly, to a capacitive touchpad having dual traces coupled with uneven spaced interlaced sensors.

BACKGROUND OF THE INVENTION

Capacitive touchpad is widely used as pointing devices in computer systems. Conventional capacitive touchpad detects the capacitance variance occurred in a sensor array, arranged in one-dimensional or two-dimensional manner, to determine the position of the finger touched thereon, and the movement and moving speed of the finger are determined by the variance of the position. The application for a mouse Z-axis are shown in FIGS. 1A and 1B. On a capacitive touchpad 10 there is a plurality of sensors 12 each coupled to a corresponding one of traces X1-X8 in a row of scan lines 16 coupled to a controller 14. When a finger touches the capacitive touchpad 10, the capacitance variance is detected by scanning the sensors 12, whose waveform is shown in FIG. 1B, to determine the position of the finger touched on the panel. For example, the distribution shown in FIG. 1B will determine that the finger touches on the sensor coupled to the trace X5, since the peak capacitance variance occurs at the trace X5. When the finger slides on the touchpad 10, the position that produces the peak capacitance variance moves as well, and therefore, the movement and moving speed of the finger may be determined by the moving peak capacitance variance to further produce a Z-axis signal.

However, when the number of the sensors 12 increases, the number of the corresponding traces increases as well, and the application circuitry within the controller 14 also becomes more complex, thereby increasing the chip size and the manufacture and package cost therefor.

Therefore, it is desired a capacitive touchpad with fewer traces and a method thereof to reduce the cost and to simplify the application circuitry and to easily achieve the design of mouse Z-axis.

SUMMARY OF THE INVENTION

An object of the present invention is to provide a capacitive touchpad and a detection method thereof.

Another object of the present invention is to provide a capacitive touchpad with fewer traces.

Yet another object of the present invention is to provide a capacitive touchpad of simple application circuitry and low cost and easily to integrate with conventional Z-axis mouse circuitry.

According to the present invention, a capacitive touchpad comprises two traces each coupled with a plurality of sensors, and the sensors are arranged interlaced and uneven spaced therebetween.

In a detection method according to the present invention, the sensors are detected for their capacitance variances to produce a first trace signal and a second trace signal, and a moving direction of an object sliding on the capacitive touchpad is determined based on a phase between the two trace signals.

According to the present invention, a capacitive touchpad in a mouse Z-axis comprises two traces each coupled with a plurality of sensors, and the sensors are arranged interlaced and uneven spaced therebetween, wherein two trace signals are produced with a lead or lag phase therebetween in response to the capacitance variances of the sensors for scroll bar control of a window.

BRIEF DESCRIPTION OF DRAWINGS

These and other objects, features and advantages of the present invention will become apparent to those skilled in the art upon consideration of the following description of the preferred embodiments of the present invention taken in conjunction with the accompanying drawings, in which:

FIG. 4A shows a phase leading voltage waveform produced by the capacitive touchpad of FIG. 2;

FIG. 4B shows a phase lagging voltage waveform produced by the capacitive touchpad of FIG. 2;

DETAILED DESCRIPTION OF THE INVENTION

Figures 1A, 1B:
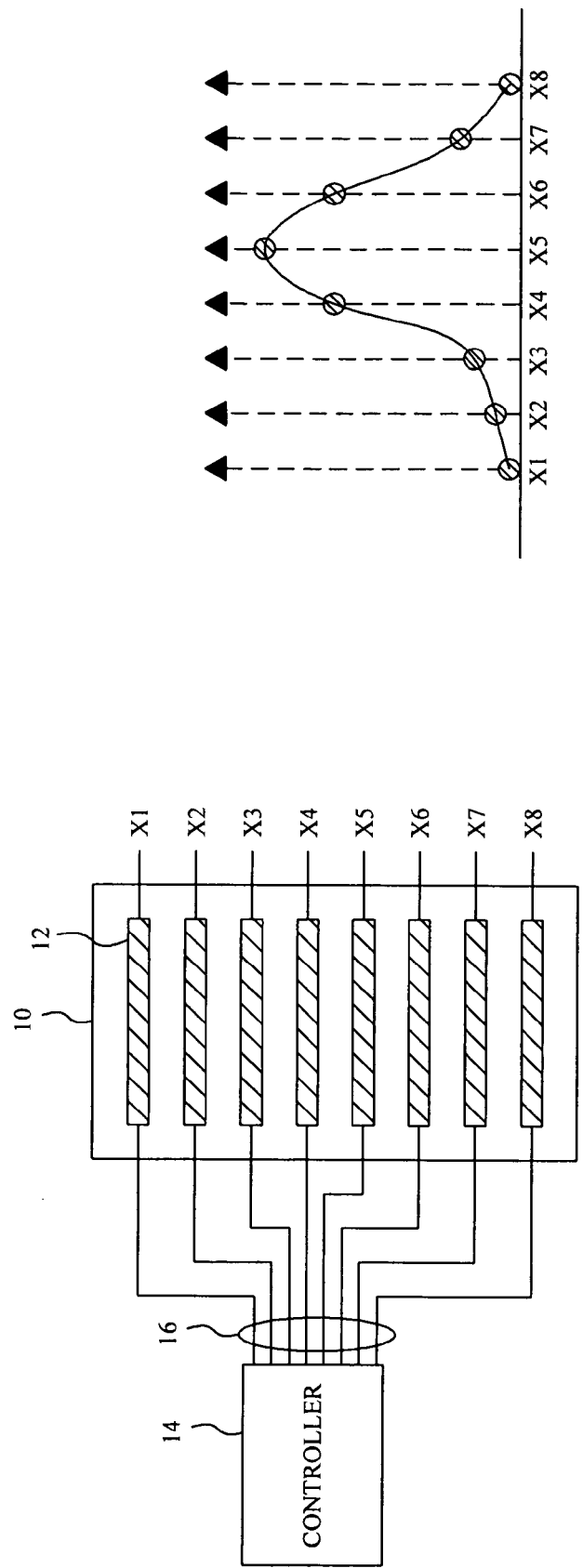
FIG. 1A shows a conventional capacitive touchpad.
FIG. 1B shows the capacitance variance produced by detecting the capacitive touchpad of FIG. 1A.
Figure 2:
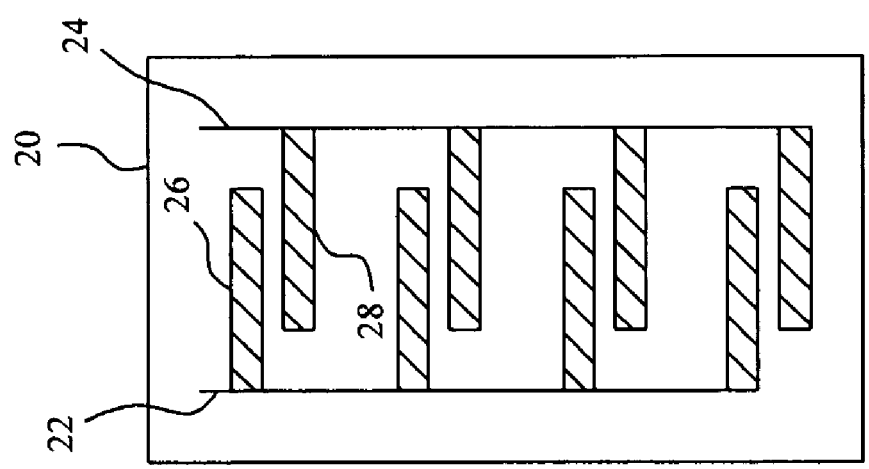
FIG. 2 shows a first embodiment according to the present invention.

FIG. 2 shows an embodiment according to the present invention. A capacitive touchpad 20 has two traces 22 and 24 and interlaced uneven spaced sensors 26 and 28, and the sensors 26 and 28 are coupled to the traces 22 and 24, respectively.

A detection method for the capacitive touchpad 20 comprises detecting the capacitance variances occurred in the interlaced uneven spaced sensors 26 and 28 on the traces 22 and 24, generating two trace signals from the traces 22 and 24 respectively, and setting and changing the voltage levels based on the capacitance variances, producing the phases of the trace signals, and determining the moving direction of an object sliding on the capacitive touchpad 20 based on the phases of the trace signals.

Figures 3A, 3B, 3C, 3D:
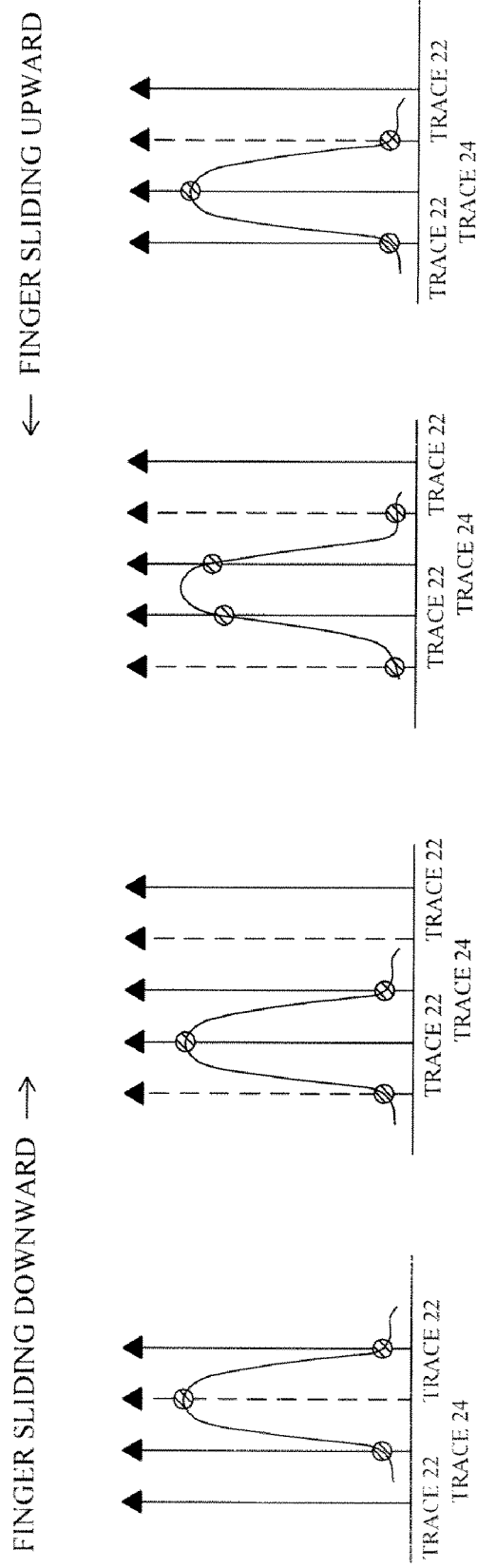
FIGS. 3A-3D illustrate the capacitance variances produced by detecting the capacitive touchpad of FIG. 2 when it is operated.

Referring additionally to FIG. 3, FIG. 3 illustrates the capacitance variances produced by detecting the capacitive touchpad 20 when it is operated. When a finger slides downward on the capacitive touchpad 20, the first touched position is at one having no sensors, and the produced capacitance variance is shown in FIG. 3A. The sensor 26 coupled to the trace 22 is then touched and produces a capacitance variance as shown in FIG. 3B. Afterwards, the sensor 26 coupled to the trace 22 and the sensor 28 coupled to the trace 24 are both touched and produce a capacitance variance as shown in FIG. 3C. The sensor 28 coupled to the trace 24 is then touched and produces a capacitance variance as shown in FIG. 3D. At last, a position with no sensors is touched and a capacitance variance as shown in FIG. 3A is produced. Therefore, a periodic signal representative of a sliding from the top to the bottom on the touchpad 20 is generated. Similarly, when a finger slides upward on the capacitive touchpad 20, a position with no sensors is first touched and a capacitance variance as shown in FIG. 3A is produced. The sensor 28 is then touched and produces a capacitance variance as shown in FIG. 3D. Afterwards, the sensors 28 and 26 are both touched and produce the capacitance variance as shown in FIG. 3C. The sensor 26 is then touched and produces a capacitance variance as shown in FIG. 3B. At last, a position with no sensors is touched and produces a capacitance variance as shown in FIG. 3A. A periodic signal representative of a sliding from the bottom to the top on the touchpad 20 is thus generated. Based on the periodic signal produced by a downward sliding on the touchpad 20, a phase leading voltage waveform as shown in FIG. 4A is generated. Contrarily, a phase lagging voltage waveform as shown in FIG. 4B will be generated in response to a periodic signal produced by an upward sliding on the touchpad 20. The phase leading and lagging signals as shown in FIGS. 4A and 4B are similar to the characteristics of a Z-axis wheel of a mouse. Therefore, in accordance with a capacitive touchpad and a detection method of the present invention, the sliding of a finger on the capacitive touchpad is capable of generating a periodic signal without complex circuitry computation to reach the design of a mouse Z-axis. It thus solves the problems resulted from conventional touchpad implemented with multiple traces sensing that require extremely complex circuitry computation and transformation process.

Moreover, a mouse Z-axis design based on the periodic signal of the present invention has the same signal structure as that of a wheel mouse. It is therefore easily to integrate with the circuitry of a conventional Z-axis mouse, without the necessity of going through complex circuitry computation and transformation. Further, there is no need of a large amount of traces and the application circuit will be more simple and less cost.

Figure 5:
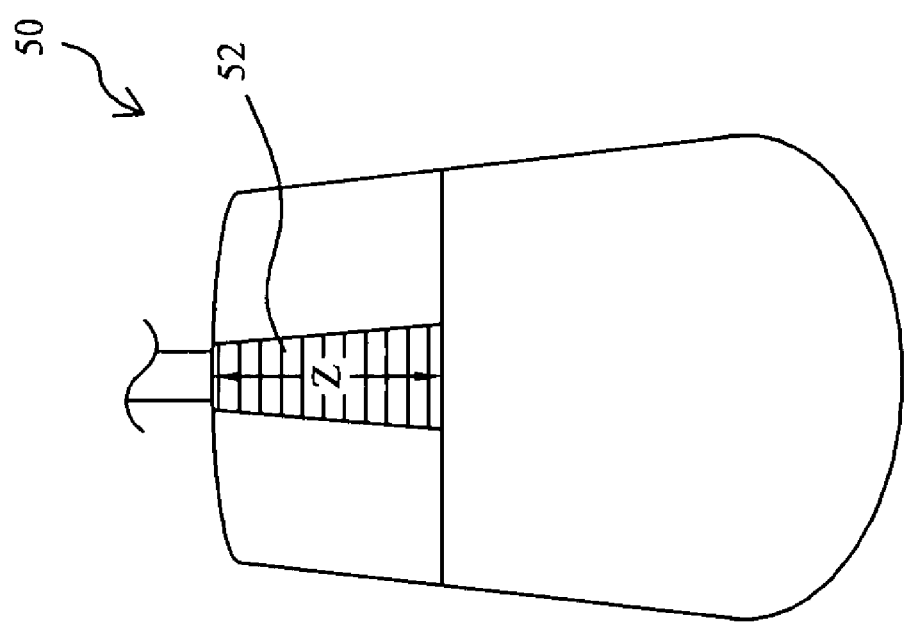
FIG. 5 shows a mouse having a Z-axis mechanism implemented with the capacitive touchpad of FIG. 2.

FIG. 5 shows a mouse 50 having a Z-axis mechanism 52 implemented with the capacitive touchpad 20 of FIG. 2. By incorporating a detection method for the capacitive touchpad 20, the moving direction of a finger sliding on the capacitive touchpad 20 is determined and the determined moving direction is used for scroll bar control of a window.

Figure 6:
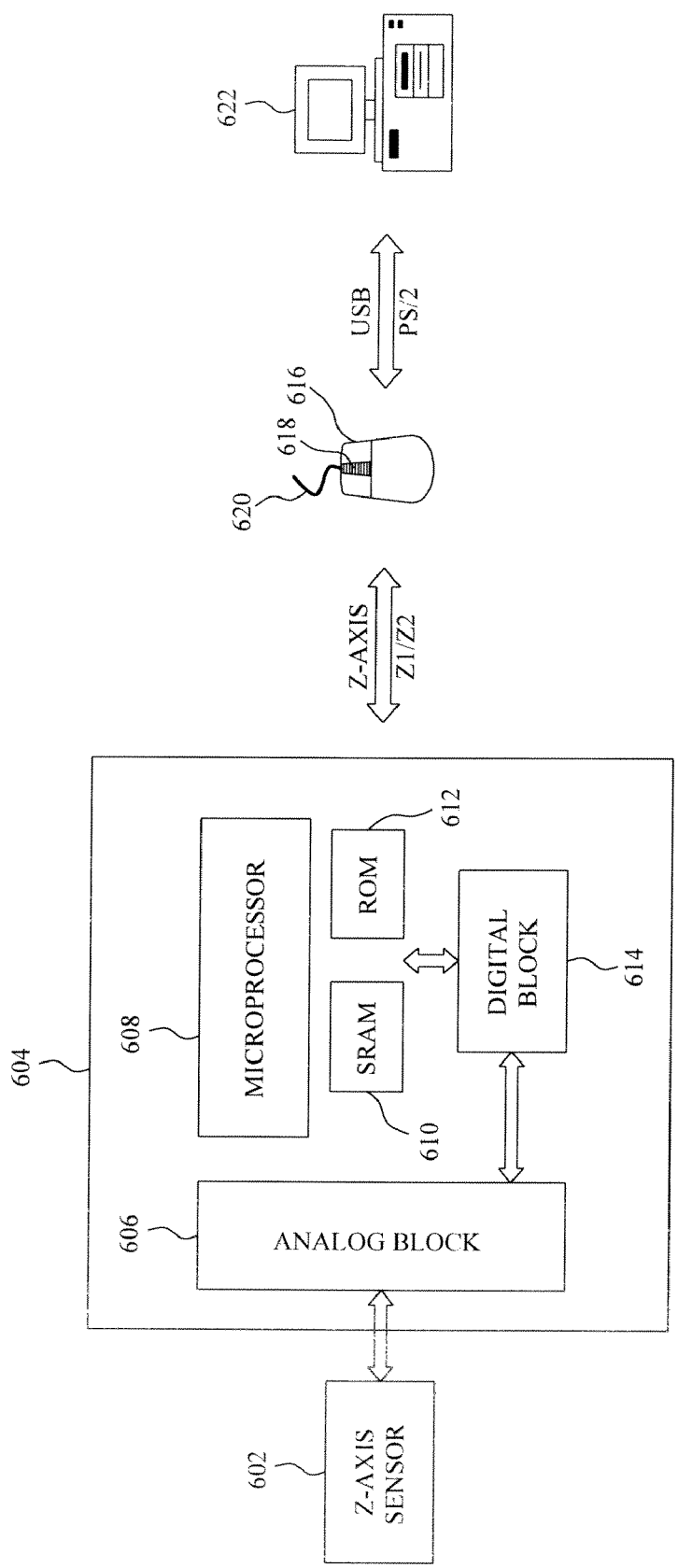
FIG. 6 shows a system block diagram when employing a capacitive touchpad of the present invention.

FIG. 6 shows a system block diagram when employing a capacitive touchpad of the present invention. This system comprises a Z-axis sensor 602 and a signal processing unit 604. The signal detected by the Z-axis sensor 602 is processed by an analog block 606, digital bock 614, microprocessor 608, SRAM 610 and ROM 612 within the signal processing unit 604 to generate a Z-axis signal for the Z-axis mechanism 618 of a mouse 616 coupled to a computer 622 with a USB or PS/2 interface through cable 620 to perform the scroll function of the scroll bars of a window on the computer 622.

Figure 7:
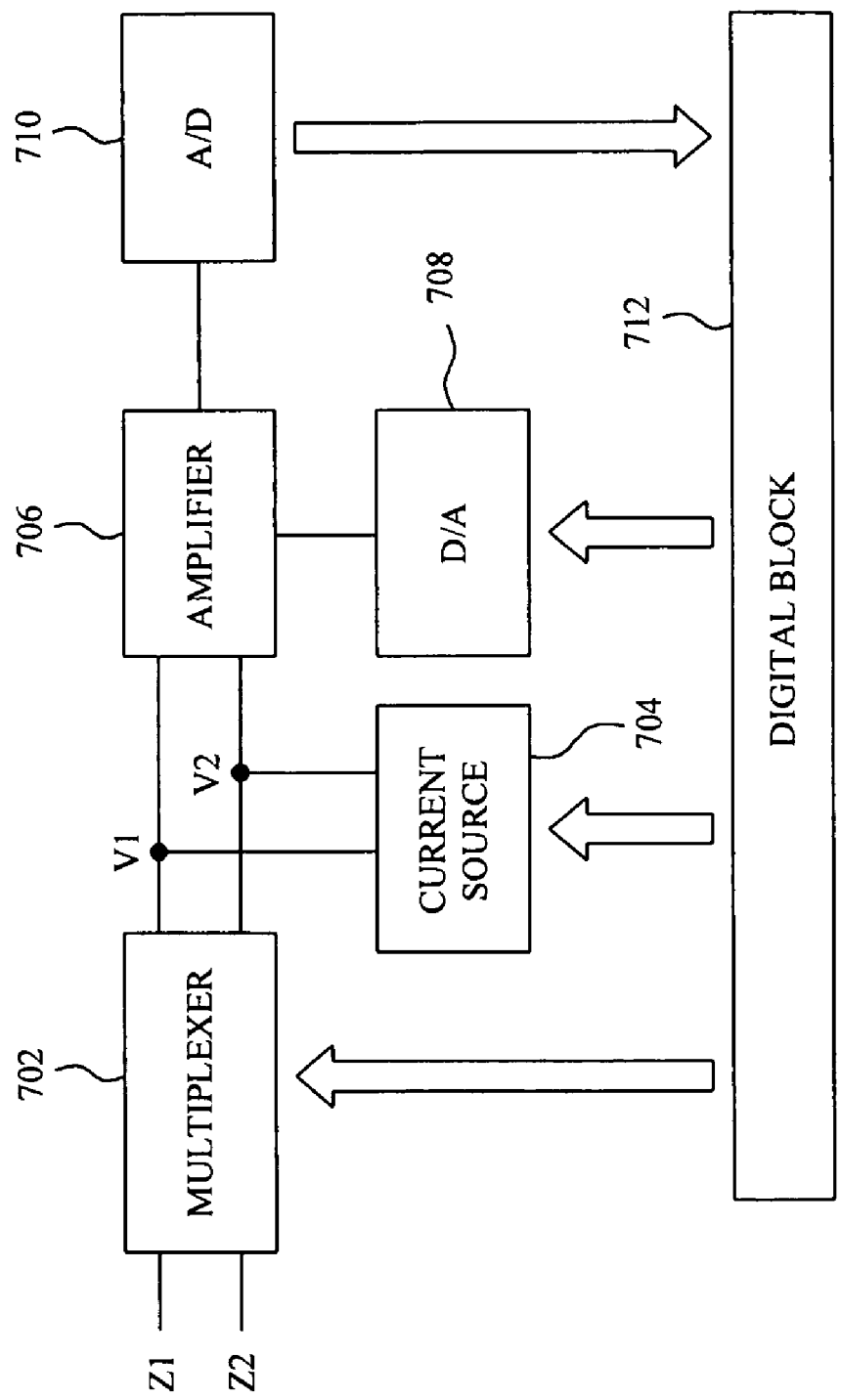
FIG. 7 shows a functional block diagram of the analog block of FIG. 6.

FIG. 7 shows a functional block diagram of the analog block 606 of FIG. 6, which comprises two Z-axis signals Z1 and Z2 coupled to a multiplexer 702, a current source 704 coupled to the output of the multiplexer 702 to provide current for generating two voltage signals V1 and V2, a digital to analog converter (D/A converter) 708 to provide a voltage level to an amplifier 706, an analog to digital converter (A/D converter) 710 coupled with the output of the amplifier 706 to transform the analog signal provided by the amplifier 706 to a digital signal sent to the microprocessor 608 via a digital block 712 to generate a phase leading or lagging voltage waveform.

Figure 8:
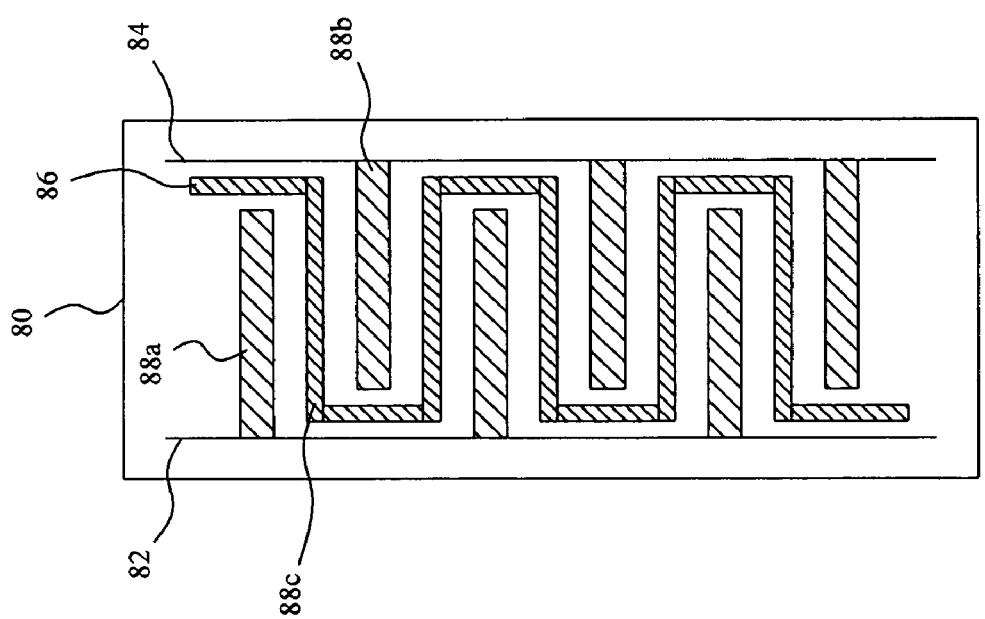
FIG. 8 shows a second embodiment according to the present invention.

FIG. 8 shows another embodiment according to the present invention. A capacitive touchpad 80 has an auxiliary trace 86 between two traces 82 and 84, and, similarly to that shown in FIG. 2, sensors 88a and 88b respectively coupled to the traces 82 and 84 are interlaced and uneven spaced therebetween. The sensors 88c coupled to the trace 86 are interlaced between the sensors 88a and 88b respectively coupled to the traces 82 and 84. The function of the primary traces 82 and 84 are the same as that of the traces 22 and 24 shown in FIG. 2, and the detected signal from the auxiliary trace 86 coupled with the sensors 88c may be used as a reference for the traces 82 and 84, such as for the signal level.

Figure 9:
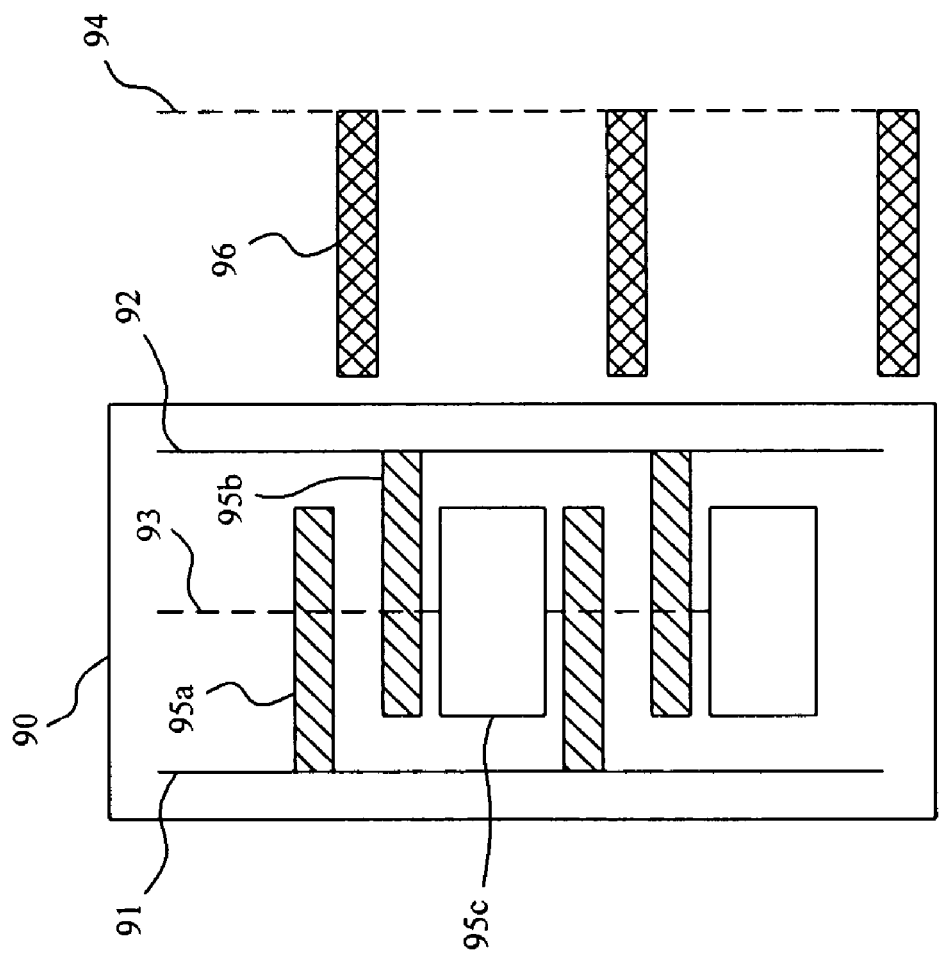
FIG. 9 shows a third embodiment according to the present invention.

FIG. 9 shows a third embodiment according to the present invention. A capacitive touchpad 90 has traces 91, 92, 93 and 94. However, more traces 94 may be employed in other embodiments. Sensors 95a and 95b coupled to the primary traces 91 and 92 are interlaced and uneven spaced therebetween, sensors 95c coupled to the auxiliary trace 93 are arranged between the sensors 95a and 95b, and sensors 96 coupled to the further trace 94 are also arranged between the sensors 95a and 95b. For clear illustration, the trace 94 and its sensors 96 are shifted to the right side. The function of the primary traces 91 and 92 are the same as that of the traces 22 and 24 shown in FIG. 2, and the detected signal from the trace 93 produced by the sensors 95c may be used as a reference for the traces 91 and 92 as that shown in FIG. 8. The detected signal from the trace 94 produced by the sensors 96 may be used as an auxiliary reference to determine the capacitance variances on the primary traces 91 and 92.

The capacitive touchpads 80 and 90 shown in FIGS. 8 and 9 are advantageous to reduce the signal loss when the finger is sliding thereon, so as to improve the accuracy when operating the capacitive touchpad.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A capacitive touchpad comprising:
a first trace and a second trace;
a plurality of first sensors and a plurality of second sensors alternately coupled to the first and second traces, the first and second sensors interlaced and unevenly spaced therebetween, the plurality of first sensors being coupled to the first trace and the plurality of second sensors being coupled to the second trace; and
a detecting circuit coupled to the first and second traces for detecting a phase difference between a first signal on the first trace and a second signal on the second trace responsive to a capacitive change detected by the plurality of first and second sensors due to movement of an object on the capacitive touchpad, the detecting circuit determining a direction of movement based on which phase of the first and second signals is leading with respect to the other.

2. The touchpad of claim 1, further comprising:
a third trace; and
a plurality of third sensors coupled to the third trace and interlaced between the first and second sensors.

3. The touchpad of claim 2, further comprising:
one or more fourth traces; and
a plurality of fourth sensors coupled to the fourth traces an interlaced between the first and second sensors.

4. A detection method for a capacitive touchpad including a first trace and a second trace with a plurality of first and second sensors coupled thereto respectively, the first and second sensors alternately coupled to the first and second traces, the first and second sensors being arranged interlaced and unevenly spaced to each other, the method comprising the steps of:

detecting a capacitance variance of the sensors to produce a first trace signal and a second trace signal; and determining a moving direction of an object sliding on the capacitive touchpad based on a phase difference between the first and second trace signals.

5. The method of claim 4, further comprising determining the phase based on shifting a reference of a voltage level corresponding to the capacitance variance.

6. The method of claim 4, wherein the step of determining the moving direction comprises determining a phase leading or lagging between the first and second trace signals.

7. A detection method for a capacitive touchpad including a first trace, a second trace and a third trace with a plurality of first, second and third sensors coupled thereto respectively, the first and second sensors alternately coupled to the first and second traces, the first and second sensors being arranged interlaced and unevenly spaced to each other, the third sensors being arranged interlaced between the first and second sensors, the method comprising the steps of:

detecting a capacitance variance of the sensors to produce a first trace signal, a second trace signal and a third trace signal; and determining a moving direction of an object sliding on the capacitive touchpad based on a phase difference between the first and second trace signals;

wherein the third trace signal is used as a reference for establishing the first and second trace signals.

8. The method of claim 7, further comprising determining the phase based on shifting the reference of the voltage level corresponding to the capacitance variance.

9. The method of claim 7, wherein the step of determining the moving direction comprises determining a phase leading or lagging between the first and second trace signals.

10. A detection method for a capacitive touchpad including a first trace, a second trace, a third trace and a fourth trace with a plurality of first, second, third and fourth sensors coupled thereto respectively, the first and second sensors alternately coupled to the first and second traces, the first and second sensors being arranged interlaced and unevenly spaced to each other, the third and fourth sensors being arranged interlaced between the first and second sensors, the method comprising the steps of:

detecting a capacitance variance of the sensors to produce a first trace signal, a second trace signal, a third trace signal and a fourth trace signal; and determining a moving direction of an object sliding on the capacitive touchpad based on a phase difference between the first and second trace signals;

wherein the third trace signal is used as a first reference for establishing the first and second trace signals, and the fourth trace signal is used as a second reference for determining a capacitance variance.

11. The method of claim 10, further comprising determining the phase based on a voltage level corresponding to the capacitance variance.

12. The method of claim 10, wherein the step of determining the moving direction comprises determining a phase leading or lagging between the first and second trace signals.

13. The method of claim 10, wherein the fourth trace comprises a plurality of sub-traces.

* * * * *